(12) United States Patent
Carey et al.

(10) Patent No.: US 8,047,952 B2
(45) Date of Patent: Nov. 1, 2011

(54) MULTI-SPEED TRANSAXLE

(75) Inventors: Clinton E. Carey, Highland, MI (US); Scott H. Wittkopp, Ypsilanti, MI (US); James M. Hart, Belleville, MI (US); Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 420 days.

(21) Appl. No.: 12/330,052

(22) Filed: Dec. 8, 2008

(65) Prior Publication Data
US 2009/0264245 A1 Oct. 22, 2009

Related U.S. Application Data

(60) Provisional application No. 61/046,541, filed on Apr. 21, 2008.

(51) Int. Cl.
*F16H 3/44* (2006.01)
(52) U.S. Cl. .......................... 475/282; 475/288
(58) Field of Classification Search .................. 475/271, 475/275–292
See application file for complete search history.

(56) References Cited

U.S. PATENT DOCUMENTS

| | | | | |
|---|---|---|---|---|
| 2009/0209384 A1* | 8/2009 | Carey et al. | .................. | 475/205 |
| 2009/0209385 A1* | 8/2009 | Carey et al. | .................. | 475/221 |
| 2009/0209388 A1* | 8/2009 | Carey et al. | .................. | 475/276 |
| 2009/0209390 A1* | 8/2009 | Carey et al. | .................. | 475/282 |
| 2009/0209391 A1* | 8/2009 | Carey et al. | .................. | 475/282 |
| 2009/0215581 A1* | 8/2009 | Carey et al. | .................. | 475/276 |
| 2009/0215582 A1* | 8/2009 | Carey et al. | .................. | 475/277 |
| 2009/0264238 A1* | 10/2009 | Carey et al. | .................. | 475/198 |
| 2009/0264239 A1* | 10/2009 | Carey et al. | .................. | 475/276 |
| 2009/0264240 A1* | 10/2009 | Carey et al. | .................. | 475/276 |
| 2009/0264242 A1* | 10/2009 | Carey et al. | .................. | 475/276 |
| 2009/0264246 A1* | 10/2009 | Carey et al. | .................. | 475/275 |
| 2009/0264247 A1* | 10/2009 | Carey et al. | .................. | 475/276 |

* cited by examiner

*Primary Examiner* — David D Le
*Assistant Examiner* — Derek D Knight

(57) ABSTRACT

A front wheel drive transmission is provided having a transmission input member, a transmission output member, four planetary gear sets, a plurality of coupling members and a plurality of torque transmitting devices. Each of the planetary gear sets includes a sun gear member, a planet carrier member, and a ring gear member. The torque transmitting devices include clutches and a brake arranged within a transmission housing.

21 Claims, 2 Drawing Sheets

| Clutch | Zone Location ||||||
|---|---|---|---|---|---|---|
| | A | B | C | D | E | F |
| 72 | X | X | | | | X |
| 74 | X | X | | | | X |
| 68 | | X | X | X | | X |
| 66 | | X | X | X | | X |
| 70 | | | X | X | X | X |

MULTI-SPEED TRANSAXLE

CROSS-REFERENCE TO RELATED APPLICATIONS

This application claims the benefit of U.S. Provisional Application No. 61/046,541, filed on Apr. 21, 2008, which is hereby incorporated in its entirety herein by reference.

FIELD

The invention relates generally to a multiple speed transmission having a plurality of planetary gear sets and a plurality of torque transmitting devices and more particularly to a transmission configured for a front wheel drive vehicle having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transaxle is provided having a transmission input member, a transmission output member, a plurality of planetary gear sets, and a plurality of torque-transmitting mechanisms. The plurality of planetary gear sets each have a sun gear member, a planetary carrier member, and a ring gear member.

In one aspect of the present invention, the housing of the transaxle has a first wall, a second wall, and a third wall extending between the first and second walls. The first, second, third and fourth planetary gear sets are disposed within the housing. The second planetary gear set is adjacent the first wall, the fourth planetary gear set is adjacent second wall, the first planetary gear set is adjacent the second planetary gear set and the third planetary gear set is between the first and fourth planetary gear sets.

Moreover, the ring gear member of the first planetary gear set is permanently coupled to the sun gear member of the fourth planetary gear set. The sun gear member of the first planetary gear set is permanently coupled to the sun gear member of the second planetary gear set. The planet carrier member of the second planetary gear set is permanently coupled to the ring gear member of the third planetary gear set. The planet carrier member of the third planetary gear set is permanently coupled to the planet carrier member of the fourth planetary gear set. The transmission output member is permanently coupled with the carrier members of the third and fourth planetary gear sets. The transmission input member is permanently coupled with the carrier member of the first planetary gear set.

Further, the housing has a first area defined radially inward from an outer periphery of the planetary gear sets and axially bounded by the first wall and the second planetary gear set, a second area defined radially inward from the outer periphery of the planetary gear sets and axially bounded by the second and first planetary gear sets, a third area defined radially inward from the outer periphery of the planetary gear sets and axially bounded by the first and third planetary gear sets, a fourth area defined radially inward from the outer periphery of the planetary gear sets and axially bounded by the third and fourth planetary gear set, a fifth area defined radially inward from the outer periphery of the planetary gear sets and axially bounded by the fourth planetary gear set and the second wall, and a sixth area defined radially inward from the third wall and radially outward from the outer periphery of the planetary gear sets and axially bounded by the first wall and the second wall.

In another aspect of the present invention, a first clutch is disposed in at least one of the second, third, fourth and sixth areas. A second clutch is disposed in at least one of the second, third, fourth and sixth areas. A third clutch is disposed in at least one of the third, fourth, fifth and sixth areas. A first brake is disposed in at least one of the first, second and sixth areas. A second brake is disposed in at least one of the first, second and sixth areas. The clutches and the brakes are selectively engageable to establish at least eight forward speed ratios and at least one reverse speed ratio between the transmission input member and the transmission output member.

In yet another aspect of the present invention, a transfer gear train is provided having a first and second transfer gear. The first transfer gear is rotatably fixed to the transmission output member and the second transfer gear is rotatably fixed to an intermediate shaft. A differential gear set is provided for driving a pair of road wheels. A pinion gear is rotatably fixed to the intermediate shaft, and an input differential gear in mesh with the pinion gear and configured to rotatably drive the differential gear set is also provided.

In still another aspect of the present invention, a power transfer assembly having a first and second transfer gear, a power transfer member, a final drive planetary gear set and a differential gear set. The first transfer gear is rotatably fixed to the transmission member and the second transfer gear is rotatably fixed to a drive shaft. The power transfer member is rotatably coupled to the first and second transfer gear for transferring rotational energy from the first transfer gear to the second transfer gear. The final drive planetary gear set is coupled to the drive shaft for receiving a driving torque from the second transfer gear. The differential gear set is coupled to the final drive planetary gear set and to a pair of road wheels for receiving a final drive rotational torque and transferring the final drive torque to the pair of road wheels.

Further, areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figures 1A, 1B:
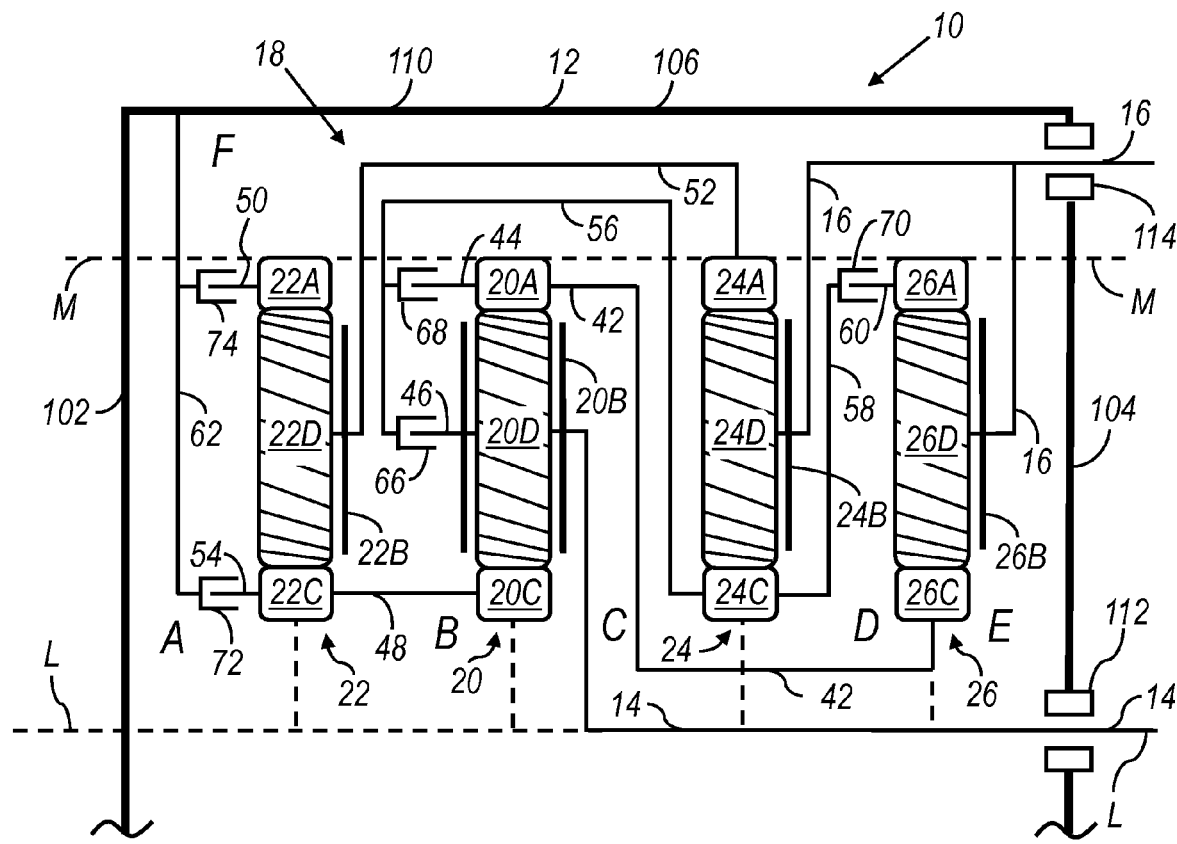
FIG. 1A is a schematic diagram of a gear arrangement for a front wheel drive transmission, according to the principles of the present invention.
FIG. 1B is a chart showing the locations of the torque transmitting devices for the arrangement of planetary gear sets of the transmission shown in FIG. 1A, in accordance with the embodiments of the present invention.
Figure 2:
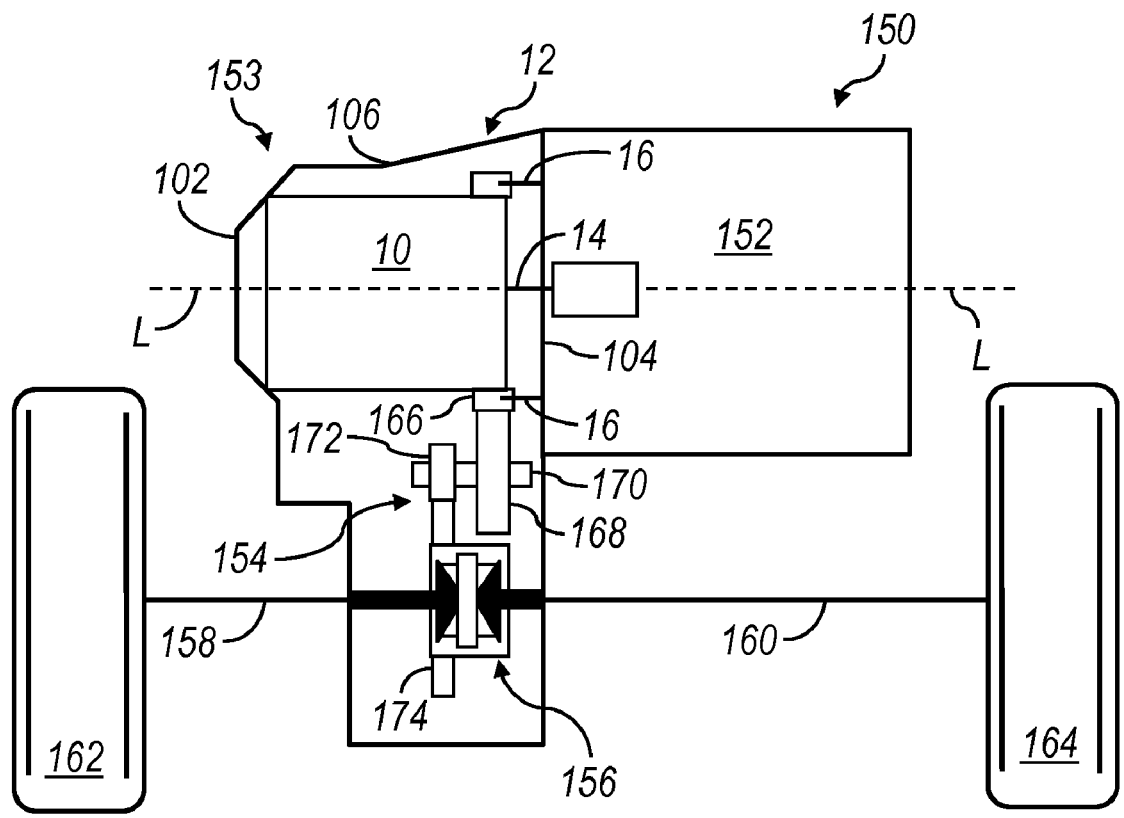
Figure 3:
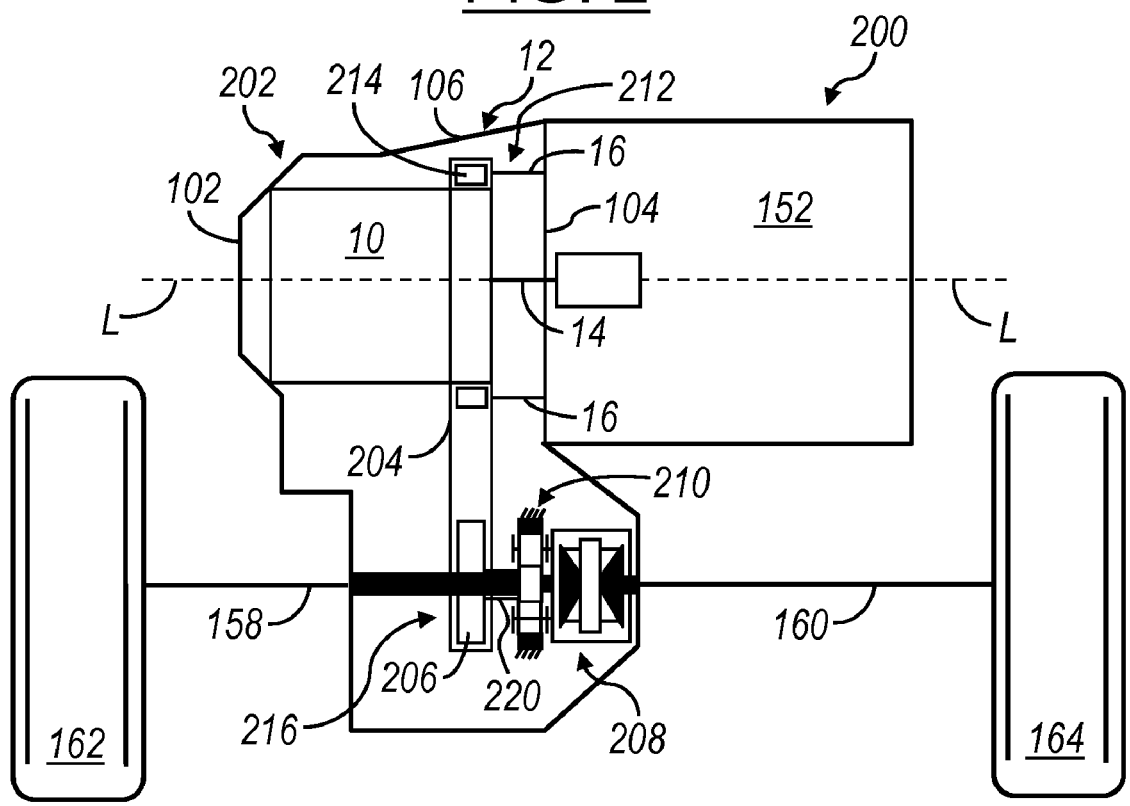

FIG. 2 is a schematic diagram of a front wheel drive transaxle arrangement incorporating the gear arrangement of the transmission of FIG. 1A and FIG. 1B, according to the principles of the present invention; and FIG. 3 is a schematic diagram of another embodiment of a front wheel drive transaxle arrangement incorporating the gear arrangement of the transmission of FIG. 1A and FIG. 1B, according to the principles of the present invention.

DETAILED DESCRIPTION

The following description is merely exemplary in nature and is not intended to limit the present disclosure, application, or uses.

Referring now to FIG. 1A, an embodiment of a front wheel drive multi-speed or eight speed transmission is generally indicated by reference number 10. The transmission 10 is illustrated as a front wheel drive or transverse transmission, though various other types of transmission configurations may be employed. The transmission 10 includes a transmission housing 12, an input shaft or member 14, an output shaft or member 16 and a gear arrangement 18. The input member 14 is continuously connected to an engine (not shown) or to a turbine of a torque converter (not shown). The output member 16 is continuously connected with a final drive unit (not shown) or transfer case (not shown).

The gear arrangement 18 of transmission 10 includes a first planetary gear set 20, a second planetary gear set 22, a third planetary gear set 24, and a fourth planetary gear set 26. The planetary gear sets 20, 22, 24 and 26 are connected between the input member 14 and the output member 16.

In a preferred embodiment of the present invention, the planetary gear set 20 includes a ring gear member 20A, a planet carrier member 20B that rotatably supports a set of planet or pinion gears 20D (only one of which is shown) and a sun gear member 20C. The ring gear member 20A is connected for common rotation with a first shaft or intermediate member 42 and a second shaft or intermediate member 44. The planet carrier member 20B is connected for common rotation with input shaft or member 14 and a third shaft or intermediate member 46. The sun gear member 20C is connected for common rotation with a fourth shaft or intermediate member 48. Each of the pinion gears 20D are configured to intermesh with both the sun gear member 20C and the ring gear member 20A.

The planetary gear set 22 includes a ring gear member 22A, a planet carrier member 22B that rotatably supports a set of planet or pinion gears 22D and a sun gear member 22C. The ring gear member 22A is connected for common rotation with a fifth shaft or intermediate member 50. The planet carrier member 22B is connected for common rotation with a sixth shaft or intermediate member 52. The sun gear member 22C is connected for common rotation with the fourth shaft or intermediate member 48 and a seventh shaft or intermediate member 54. Each of the pinion gears 22D are configured to intermesh with both the sun gear member 22C and the ring gear member 22A.

The planetary gear set 24 includes a ring gear member 24A, a planet carrier member 24B that rotatably supports a set of planet or pinion gears 24D and a sun gear member 24C. The ring gear member 24A is connected for common rotation with the sixth shaft or intermediate member 52. The planet carrier member 24B is connected for common rotation with the output shaft or member 16. The sun gear member 24C is connected for common rotation with an eighth shaft or intermediate member 56 and a ninth shaft or intermediate member 58. Each of the pinion gears 24D are configured to intermesh with both the sun gear member 24C and the ring gear member 24A.

The planetary gear set 26 includes a ring gear member 26A, a carrier member 26B that rotatably supports a set of planet or pinion gears 26D and a sun gear member 26C. The ring gear member 26A is connected for common rotation with a tenth shaft or intermediate member 60. The planet carrier member 26B is connected for common rotation with the output shaft or member 16. The sun gear member 26C is connected for common rotation with a first shaft or intermediate member 42. Each of the pinion gears 26D are configured to intermesh with both the sun gear member 26C and the ring gear member 26A.

The transmission 10 also includes a plurality of torque-transmitting mechanisms or devices including a first clutch 66, a second clutch 68, a third clutch 70, a first brake 72 and a second brake 74. The first clutch 66 is selectively engagable to connect the third shaft or intermediate member 46 to the eighth shaft or intermediate member 56. The second clutch 68 is selectively engagable to connect the second shaft or intermediate member 44 to the eighth shaft or intermediate member 56. The third clutch 70 is selectively engagable to connect the ninth shaft or intermediate member 58 to the tenth shaft or intermediate member 60. The first brake 72 is selectively engagable to connect the seventh shaft or intermediate member 54 to the transmission housing 12 through an eleventh shaft or member 62 to restrict rotation of the member 54 relative to the transmission housing 12. Finally, the second brake 74 is selectively engagable to connect the fifth shaft or intermediate member 50 to the transmission housing 12 through the eleventh shaft or member 62 to restrict rotation of the member 50 relative to the transmission housing 12.

The transmission 10 is capable of transmitting torque from the input shaft or member 14 to the output shaft or member 16 in at least eight forward torque ratios and one reverse torque ratio. Each of the forward torque ratios and the reverse torque ratio are attained by engagement of one or more of the torque-transmitting mechanisms (i.e. first clutch 66, second clutch 68, third clutch 70, first brake 72 and second brake 74). Those skilled in the art will readily understand that a different speed ratio is associated with each torque ratio. Thus, eight forward speed ratios may be attained by the transmission 10.

The transmission housing 12 includes a first wall or structural member 102, a second wall or structural member 104 and a third wall or structural member 106. The third wall 106 interconnects the first and second walls 102 and 104 to define a space or cavity 110. Input and output shafts or members 14, 16 are supported by the second wall 104 by bearings 112 and bearings 114, respectively. The planetary gear sets 20, 22, 24 and 26 and the torque-transmitting mechanisms 66, 68, 70, 72 and 74 are disposed within cavity 110. Further, the cavity 110 has a plurality of areas or zones A, B, C, D, E, and F in which the plurality of torque transmitting mechanisms 66, 68, 70, 72 and 74 will be specifically positioned or mounted, in accordance with the preferred embodiments of the present invention.

As shown in FIG. 1A, zone A is defined by the area or space bounded by: the first wall 102, planetary gear set 22, radially inward by a reference line "L" which is a longitudinal line that is axially aligned with the input shaft 14, and radially outward by a reference line "M" which is a longitudinal line that extends adjacent an outer diameter or outer periphery of the planetary gear sets 20, 22, 24 and 26. While reference line "M" is illustrated as a straight line throughout the several views, it should be appreciated that reference line "M" follows the outer periphery of the planetary gear sets 20, 22, 24 and 26, and accordingly may be stepped or non-linear depending on the location of the outer periphery of each of the planetary gear sets 20, 22, 24 and 26. Zone B is defined by the area bounded by: planetary gear set 22, the planetary gear set 20, radially outward by reference line "M", and radially inward by reference line "L". Zone C is defined by the area bounded by: the planetary gear set 20, the planetary gear set 24, radially outward by reference line "M", and radially inward by reference line "L". Zone D is defined by the area bounded by: the planetary gear set 24, the planetary gear set 26, radially outward by reference line "M", and radially inward by reference line "L". Zone E is defined by the area bounded by: the planetary gear set 26, the second wall 104, radially outward by reference line "M", and radially inward by reference line "L". Zone F is defined by the area bounded by: the first wall 102, the wall second 104, radially inward by reference line "M" and radially outward by the third wall 106.

In the gear arrangement 18 of transmission 10 shown in FIG. 1A, the planetary gear set 22 is disposed closest to the first wall 102, the planetary gear set 26 is disposed closest to the second wall 104, the planetary gear set 20 is disposed adjacent the planetary gear set 22, and the planetary gear set 24 is disposed between the planetary gear sets 20 and 26. The torque-transmitting mechanisms are intentionally located within specific Zones in order to provide advantages in overall transmission size, packaging efficiency, and reduced manufacturing complexity. In the particular example shown in FIG. 1A, the first clutch 66 and second clutch 68 are disposed within Zone B, the third clutch 70 is disposed within Zone D and the first and second brakes 72 and 74 are disposed within Zone A.

However, the present invention contemplates other embodiments where the torque-transmitting mechanisms 66, 68, 70, 72 and 74 are disposed in the other Zones. The feasible locations of the torque-transmitting mechanisms 66, 68, 70, 72 and 74 within the Zones are illustrated in the chart shown in FIG. 1B. The chart of FIG. 1B lists clutches and brakes in the left most column and the available zones to locate the clutch/brake in the top row. An "X" in the chart indicates that the present invention contemplates locating the clutch or brake in the zone listed in the top row. For example, first brake 72 and second brake 74 may be located in zones A, B or F.

Referring now to FIG. 2, a front wheel drive powertrain 150 incorporating a transaxle 153 is illustrated, in accordance with the embodiments of the present invention. Transaxle 153 includes the transmission 10 having the gear arrangement 18 of FIGS. 1A and 1B. Transmission 10 is mounted to an engine 152. Engine 152 provides a driving torque through input shaft 14 to transmission 10. Engine 152 is generally an internal combustion engine, however, the present invention contemplates other types of engines such as electric and hybrid engines. Further, transaxle 153 includes a transfer gear train 154, a differential 156, and a pair of drive axles 158 and 160 that drive a pair of road wheels 162 and 164, respectively.

Transfer gear train 154 includes a first transfer gear 166 and a second transfer gear 168. Output shaft or member 16 is coupled to a first transfer or spur gear 166. First transfer gear 166 may be a straight spur gear having straight gear teeth or a helical gear having helical gear teeth. First transfer gear 166 meshes with the second transfer gear 168. Second transfer gear 168 is rotatably fixed to an intermediate shaft or rotatable member 170. Further, a pinion 172 is mounted to shaft 170 and intermeshes with an input differential gear 174. Input differential gear 174 is fixed to or integrally formed with the housing of the differential 156. Input differential gear 174 transfers driving torque to the differential 156. Differential 156, as conventionally known, transfers the driving torque generated by engine 152 to the two drive axles 158 and 160. Drive axles 158 and 160 are independently driven by differential 156 to supply the driving torque to the vehicle road wheels 162 and 164.

Referring now to FIG. 3, another embodiment of a front wheel drive powertrain 200 incorporating a transaxle 202 is illustrated, in accordance with the embodiments of the present invention. Transaxle 202 includes the gear arrangement 18 of transmission 10 of FIGS. 1A and 1B and is mounted to the engine 152. Engine 152 provides a driving torque through input shaft 14 to transmission gear arrangement 18. Further, transaxle 202 includes a transfer chain 204, a driven sprocket or gear 206, a differential 208, a final drive planetary gear set 210 and a pair of drive axles 158 and 160 that drive a pair of road wheels 162 and 164, respectively.

Transfer chain 204 engages, at a first end 212, a drive sprocket or transfer gear 214 and at a second end 216 the driven sprocket or transfer gear 206. The drive sprocket 214 is coupled to output shaft or member 16. Driven sprocket 206 is rotatably fixed to a final drive member or rotatable shaft 220. In an embodiment of the present invention, shaft 220 is a sleeve shaft through which drive axle 158 passes. Further, shaft 220 is coupled to the sun gear of final drive planetary gear set 210 to achieve the desired gear ratio. A carrier member of the final drive planetary gear set 210 supports a plurality of pinion gears which mesh with both the sun gear and a ring gear of final drive planetary gear set. The carrier member of final drive planetary gear set 210 is rotatably coupled to and transfers driving torque to a housing of the differential 208. Differential 208 transfers the driving torque generated by engine 152 to the two drive axles 158 and 160 through two sets of bevel gears rotationally supported in the differential housing. Drive axles 158 and 160 are independently driven by differential 208 to supply the driving torque to the vehicle road wheels 162 and 164.

The description of the invention is merely exemplary in nature and variations that do not depart from the gist of the invention are intended to be within the scope of the invention. Such variations are not to be regarded as a departure from the spirit and scope of the invention.

The invention claimed is:
1. A transaxle comprising:
   a transmission input member;
   a transmission output member;
   a housing having a first wall, a second wall, and a third wall extending between the first and second walls;
   a first, second, third and fourth planetary gear sets disposed within the housing, wherein the second planetary gear set is adjacent the first wall, the fourth planetary gear set is adjacent second wall, the first planetary gear set is adjacent the second planetary gear set and the third planetary gear set is between the first and fourth planetary gear sets, each planetary gear set having a sun gear member, a ring gear member, and a planet carrier member supporting a plurality of planet gears each configured to intermesh with both the sun gear member and the ring gear member, and wherein the ring gear member of the first planetary gear set is permanently coupled to the sun gear member of the fourth planetary gear set, the sun gear member of the first planetary gear set is permanently coupled to the sun gear member of the second planetary gear set, the planet carrier member of the second planetary gear set is permanently coupled to the ring gear member of the third planetary gear set, the planet carrier member of the third planetary gear set is permanently coupled to the planet carrier member of the fourth planetary gear set, the transmission output member is permanently coupled with the carrier members of the third and fourth planetary gear sets, and the transmission input member is permanently coupled with the carrier member of the first planetary gear set, and wherein the housing has a first area defined radially inward from an outer periphery of the planetary gear sets and axially bounded by the first wall and the second planetary gear set, a second area defined radially inward from the outer periphery of the planetary gear sets and axially bounded by the second and first planetary gear sets, a third area defined radially inward from the outer periphery of the planetary gear sets and axially bounded by the first and third planetary gear sets, a fourth area defined radially inward from the outer periphery of the planetary gear sets and axially bounded by the third and fourth planetary gear set, a fifth area defined radially inward from the outer periphery of the planetary gear sets and axially bounded by the fourth planetary gear set and the second wall, and a sixth area defined radially inward from the third wall and radially outward from the outer periphery of the planetary gear sets and axially bounded by the first wall and the second wall;

a first clutch disposed in at least one of the second, third, fourth and sixth areas;

a second clutch disposed in at least one of the second, third, fourth and sixth areas;

a third clutch disposed in at least one of the third, fourth, fifth and sixth areas;

a first brake disposed in at least one of the first, second and sixth areas;

a second brake disposed in at least one of the first, second and sixth areas, and wherein the clutches and the brakes are selectively engageable to establish at least eight forward speed ratios and at least one reverse speed ratio between the transmission input member and the transmission output member;

a transfer gear train having a first and second transfer gear, wherein the first transfer gear is rotatably fixed to the transmission output member and the second transfer gear is rotatably fixed to an intermediate shaft;

a differential gear set for driving a pair of road wheels;

a pinion gear rotatably fixed to the intermediate shaft; and an input differential gear in mesh with the pinion gear and configured to rotatably drive the differential gear set.

2. The transaxle of claim 1 wherein the first clutch is selectively engageable to interconnect the planet carrier member of the first planetary gear set with the sun gear member of the third planetary gear set and is disposed in the second area, the second clutch is disposed in the second area, the third clutch is disposed in the fourth area, the first brake is disposed in the first area and the second brake is disposed in the first area.

3. The transaxle of claim 1 wherein the first clutch is disposed within the third area.

4. The transaxle of claim 1 wherein the first clutch is disposed within the fourth area.

5. The transaxle of claim 1 wherein the first clutch is disposed within the sixth area.

6. The transaxle of claim 1 wherein the second clutch is selectively engageable to interconnect the ring gear member of the first planetary gear set with the sun gear member of the third planetary gear set wherein the second clutch is disposed within the second area.

7. The transaxle of claim 1 wherein the second clutch is disposed within the third area.

8. The transaxle of claim 1 wherein the second clutch is disposed within the fourth area.

9. The transaxle of claim 1 wherein the second clutch is disposed within the sixth area.

10. The transaxle of claim 1 wherein the third clutch is selectively engageable to interconnect the ring gear member of the fourth planetary gear set with the sun gear member of the third planetary gear set and wherein the third clutch is disposed within the fourth area.

11. The transaxle of claim 1 wherein the third clutch is disposed within the third area.

12. The transaxle of claim 1 wherein the third clutch is disposed within the fifth area.

13. The transaxle of claim 1 wherein the third clutch is disposed within the sixth area.

14. The transaxle of claim 1 wherein the first brake is selectively engageable to interconnect the sun gear member of the second planetary gear set to the housing and wherein the first brake is disposed within the first area.

15. The transaxle of claim 1 wherein the first brake is disposed within the second area.

16. The transaxle of claim 1 wherein the first brake is disposed within the sixth area.

17. The transaxle of claim 1 wherein the second brake is selectively engageable to interconnect the ring gear member of the second planetary gear set to the housing and wherein the brake is disposed within the first area.

18. The transaxle of claim 1 wherein the second brake is disposed within the second area.

19. The transaxle of claim 1 wherein the second brake is disposed within the sixth area.

20. A transaxle comprising:

a transmission input member;

a transmission output member;

a housing having a first wall, a second wall, and a third wall extending between the first and second walls;

a first, second, third and fourth planetary gear sets disposed within the housing, wherein the second planetary gear set is adjacent the first wall, the fourth planetary gear set is adjacent second wall, the first planetary gear set is adjacent the second planetary gear set and the third planetary gear set is between the first and fourth planetary gear sets, each planetary gear set having a sun gear member, a ring gear member, and a planet carrier member supporting a plurality of planet gears each configured to intermesh with both the sun gear member and the ring gear member, and wherein the ring gear member of the first planetary gear set is permanently coupled to the sun gear member of the fourth planetary gear set, the sun gear member of the first planetary gear set is permanently coupled to the sun gear member of the second planetary gear set, the planet carrier member of the second planetary gear set is permanently coupled to the ring gear member of the third planetary gear set, the planet carrier member of the third planetary gear set is permanently coupled to the planet carrier member of the fourth planetary gear set, the transmission output member is permanently coupled with the carrier members of the third and fourth planetary gear sets, and the transmission input member is permanently coupled with the carrier member of the first planetary gear set, and wherein the housing has a first area defined radially inward from an outer periphery of the planetary gear sets and axially bounded by the first wall and the second planetary gear set, a second area defined radially inward from the outer periphery of the planetary gear sets and axially bounded by the second and first planetary gear sets, a third area defined radially inward from the outer periphery of the planetary gear sets and axially bounded by the first and third planetary gear sets, a fourth area defined radially inward from the outer periphery of the planetary gear sets and axially bounded by the third and fourth planetary gear set, a fifth area defined radially inward from the outer periphery of the planetary gear sets and axially bounded by the fourth planetary gear set and the second wall, and a sixth area defined radially inward from the third wall and radially outward from the outer periphery of the planetary gear sets and axially bounded by the first wall and the second wall;

a first clutch disposed in at least one of the second, third, fourth and sixth areas and is selectively engageable to interconnect the planet carrier member of the first planetary gear set with the sun gear member of the third planetary gear set;

a second clutch disposed in at least one of the second, third, fourth and sixth areas and is selectively engageable to interconnect the ring gear member of the first planetary gear set with the sun gear member of the third planetary gear set;

a third clutch disposed in at least one of the third, fourth, fifth and sixth areas and is selectively engageable to interconnect the ring gear member of the fourth planetary gear set with the sun gear member of the third planetary gear set;

a first brake disposed in at least one of the first, second and sixth areas and is selectively engageable to interconnect the sun gear member of the second planetary gear set to the housing;

a second brake disposed in at least one of the first, second and sixth areas and is selectively engageable to interconnect the ring gear member of the second planetary gear set to the housing, and wherein the clutches and the brakes are selectively engageable to establish at least eight forward speed ratios and at least one reverse speed ratio between the transmission input member and the transmission output member;

a power transfer assembly having a first and a second transfer gear and a power transfer member, wherein the first transfer gear is rotatably fixed to the transmission output member and the second transfer gear is rotatably fixed to a final drive member and wherein the power transfer member rotatably couples the first and second transfer gears for transferring rotational energy from the first transfer gear to the second transfer gear;

a final drive planetary gear set having a final drive sun gear coupled to the final drive member, a final drive ring gear coupled to the transmission housing and a final drive carrier member rotatably supporting a final drive plurality of pinion gears intermeshed with both the final drive sun gear and the final drive ring gear; and a differential gear set having a differential housing coupled to the final drive carrier member and having a pair of gears rotatably supported in the differential housing, wherein one of the pair of the gears is rotatably fixed to one of a pair of road wheels and the other of the pair of the gears is rotatably fixed to the other one of the pair of road wheels.

21. The transaxle of claim 20, wherein the power transfer member is a chain or a belt.

* * * * *